United States Patent Office 3,079,374
Patented Feb. 26, 1963

3,079,374
MONOAZO DYESTUFFS AND ACRYLONITRILE POLYMERS DYED THEREWITH
James M. Straley and Raymond C. Harris, Kingsport, Tenn., assignors to Eastman Kodak Company, Rochester, N.Y., a corporation of New Jersey
No Drawing. Filed June 30, 1960, Ser. No. 39,797
6 Claims. (Cl. 260—152)

This invention relates to new water insoluble monoazo dyestuffs, their preparation and their application for the dyeing or coloring of acrylonitrile polymers, especially polyacrylonitrile textile materials.

We have discovered that the water insoluble monoazo compounds having the formula:

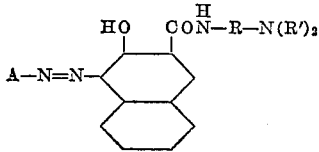

wherein A represents an anthraquinonyl nucleus which can be substituted with a member selected from the group consisting of a methyl group, a methoxy group, an ethoxy group, a bromine atom and a chlorine atom, R represents an alkylene radical selected from the group consisting of —$CH_2CH_2$—, —$CH_2CH_2CH_2$— and

—$CH_2CHOHCH_2$—

R' represents an alkyl group having 1 to 4 carbon atoms and wherein $N(R')_2$ collectively represents a member selected from the group consisting of a morpholinyl radical and a piperidyl radical are valuable dyestuffs for acrylonitrile textile materials in fiber, filament, yarn or cloth form, for example.

The new water insoluble monoazo dyestuffs of our invention are devoid of water-solubilizing groups. They have excellent affinity for polyacrylonitrile textile materials and yield bright red dyeings on these materials which have excellent fastness to light, washing, gas and sublimation.

The new monoazo compounds of our invention are prepared by diazotizing an aminoanthraquinone having the formula:

A—$NH_2$ wherein A has the meaning previously assigned to it and coupling the diazonium compound obtained with a naphthalene compound having the formula:

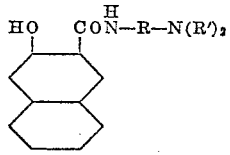

wherein R, R' and $N(R')_2$ have the meaning previously assigned to them. The diazotization and coupling reactions are carried out in accordance with conventional procedures.

1-aminoanthraquinone,
1-amino-2-methylanthraquinone,
1-amino-2-methoxyanthraquinone,
1-amino-2-ethoxyanthraquinone,
1-amino-6,7-dichloroanthraquinone,
1-amino-2-chloroanthraquinone,
1-amino-2-bromoanthraquinone,
1amino-2,4-dibromoanthraquinone,
2-aminoanthraquinone,
2-amino-3-chloroanthraquinone and
2-amino-3-bromoanthraquinone are illustrative of the aminoanthraquinone compounds used in the preparation of the azo dyestuffs of our invention.

2-hydroxy-3-N-(β-dimethylaminoethyl)naphthamide,
2-hydroxy-3-N-(β-diethylaminoethyl)naphthamide,
2-hydroxy-3-N-(β-di-n-propylaminoethyl)naphthamide,
2-hydroxy-3-N-(β-di-n-butylaminoethyl)naphthamide,
2-hydroxy-3-N-(γ-dimethylaminopropyl)naphthamide,
2-hydroxy-3 N-(γ-diethylaminopropyl)naphthamide,
2-hydroxy-3-N-(γ-di-n-propylaminopropyl)naphthamide,
2-hydroxy-3-N-(γ-di-n-butylaminopropyl)naphthamide,
2-hydroxy-3-N-(β-morpholinylethyl)naphthamide,
2-hydroxy-3-N-(γ-morpholinylpropyl)naphthamide,
2-hydroxy-3-N-(β-piperidylethyl)naphthamide,
2-hydroxy-3-N-(γ-piperidylpropyl)naphthamide,
2-hydroxy-3-N-(γ-dimethylamino-β-hydroxypropyl)naphthamide,
2-hydroxy-3-N-(γ-diethylamino-β-hydroxypropyl)naphthamide,
2-hydroxy-3-N-(γ-di-n-butylamino-β-hydroxypropyl) naphthamide,
2-hydroxy-3-N-(γ-piperidyl-β-hydroxypropyl)naphthamide, and
2-hydroxy-3-N-(γ-morpholinyl-β-hydroxypropyl)naphthamide are illustrative of the coupling components used in preparing the azo dyestuffs of our invention.

The coupling components can be prepared by reacting 2-hydroxy-3-naphthoic acid chloride or 2-acetoxy-3-naphthoic acid chloride with an amine having the formula:

$H_2N$—R—$N(R')_2$ wherein R, R' and $N(R')_2$ have the meaning previously assigned to them. When 2-acetoxy-3-naphthoic acid chloride is employed the acetyl group is split off by known methods after the reaction with the amine is complete.

The following examples illustrate the invention.

Example 1

17.84 grams of 1-aminoanthraquinone were dissolved in 100 cc. of 96% sulfuric acid. When complete solution was obtained the amine was diazotized by the addition of 5.68 grams of sodium nitrite at such a rate that the temperature remained between 30° C. to 38° C. After the addition of the sodium nitrite, the reaction mixture was stirred above 30° C. until a drop in 10 cc. of water gave a clear yellow solution with no red flocks. The reaction mixture was then poured onto 400 g. of crushed ice with good stirring. After standing one hour below 10° C. the diazonium sulfate which precipitated was recovered by filtration and washed with an ice cold saturated sodium sulfate solution.

The filter-cake obtained as described above was slurried in 500 cc. of cold water and the resulting slurry was added to a solution of 20.8 grams of 2-hydroxy-3-N-(3-dimethylaminopropyl)naphthamide in a solution of 210 cc. of 1 N NaOH diluted to 500 cc. by the addition of crushed ice. Upon completion of the coupling reaction which takes place, the reaction product which precipitated was recovered by filtration, washed well with water and dried under vacuum, at 60° C. The dye compound obtained has the formula:

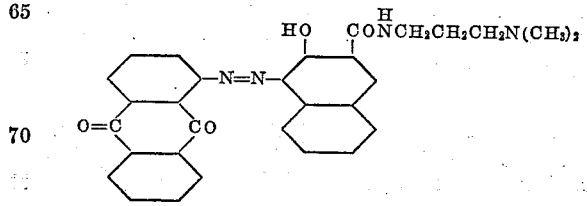

It colors polyacrylonitrile materials, such as Verel and Orlon acrylic fibers, red shades which have good fastness to light, gas, washing and sublimation.

Example 2

11.85 grams of 1-amino-2-methylanthraquinone were dissolved in 120 grams of 96% sulfuric acid and diazotized by the addition of 4 grams of sodium nitrite without cooling. After diazotization was complete the reaction mixture was poured onto 250 grams of cracked ice, allowed to stand 3 hours at 0° C. and filtered. The filter-cake was washed with a little ice water and finally with ethyl alcohol. The diazonium compound thus obtained was added in small portions to a solution of 13.7 grams of 2-hydroxy-3-N-(2-diethylaminoethyl)naphthamide in 200 cc. of 0.5% NaOH after which the reaction mixture was brought to a volume of 400 cc. with ice. The reaction mixture thus obtained was kept slightly alkaline by the addition of sodium carbonate if necessary. Upon completion of the coupling reaction the dyestuff which precipitated was recovered by filtration, washed well with water and dried under vacuum at 60° C. The monoazo dyestuff thus obtained dyes polyacrylonitrile fibers, such as Verel and Orlon acrylic fibers, red shades which have good fastness to light, gas, washing and sublimation.

Example 3

12.75 grams of 1-amino-6,7-dichloroanthraquinone were diazotized and coupled with 15.1 grams of 2-hydroxy-3-N-($\beta$-morpholinylethyl)naphthamide. Diazotization, coupling and recovery of the dye compound formed was carried out in accordance with the procedure described in Example 1. The monoazo dye compound obtained dyes polyacrylonitrile materials, such as Verel and Orlon acrylic fibers, bright red shades having good fastness to light, gas, washing and sublimation.

Example 4

15.4 grams of 2-amino-3-chloroanthraquinone were dissolved in 80 cc. of 96% sulfuric acid and diazotized by the addition of 5.2 grams of sodium nitrite in small portions. The diazonium solution thus obtained was poured onto 2000 cc. of ice and water and the resulting mixture was run into a solution of 15.6 grams of 2-hydroxy-3-N-(3-diamethylaminopropyl)naphthamide in 1500 cc. of 1% NaOH containing 25 grams of sodium acetate at a temperature below 10° C. The pH of the reaction mixture was kept above 4 by the addition of sodium acetate if necessary. Upon completion of the coupling reaction which took place the reaction product which precipitated was recovered by filtration, washed well with water and dried in air. The monoazo dyestuff obtained dyes polyacrylonitrile materials, such as Verel and Orlon acrylic fibers, red shades having good fastness to light, gas, washing and sublimation.

Example 5

5.1 grams of 1-amino-2-methoxyanthraquinone were dissolved by stirring slowly into 50 cc. of 96% sulfuric acid. When solution was complete 1.42 grams of sodium nitrite were added at such a rate that the temperature of the reaction mixture remained between 30° C. and 35° C. The reaction mixture was maintained at this temperature until diazotization was complete (about 3 hours) and then poured onto 160 grams of crushed ice and kept for one hour at or below 5° C. The diazonium compound formed was recovered by filtration and washed essentially free of acid with an ice cold saturated aqueous solution of sodium sulfate. The moist filter-cake thus obtained was dissolved in cold water to a total volume of 400 cc. at 5° C. to 10° C.

The diazonium solution obtained as just described was added, with stirring, to a solution of 6.32 grams of 2-hydroxy-3-N-($\gamma$ - diethylamino-$\beta$-hydroxypropyl)naphthamide in 80 cc. of 1 N NaOH diluted to 200 cc. by the addition of crushed ice. Upon completion of the coupling reaction which takes place the reaction product was recovered by filtration, washed well with water and dried in air. The monoazo dye compound obtained dyes polyacrylonitrile materials, such as Verel and Orlon acrylic fibers, red shades which have good fastness to light, gas, washing and sublimation.

Example 6

4.46 grams of 1-aminoanthraquinone were diazotized and the diazonium compound obtained was coupled with 6.32 grams of 2-hydroxy-3-N-($\gamma$-diethylamino-$\beta$-hydroxypropyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 7

4.46 grams of 1-aminoanthraquinone were diazotized and the diazonium compound obtained was coupled with 6.28 grams of 2-hydroxy-3-N-($\gamma$-morpholinopropyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 8

4.46 grams of 1-aminoanthraquinone were diazotized and the diazonium compound obtained was coupled with 5.16 grams of 2-hydroxy-3-N-($\beta$-dimethylaminoethyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 9

4.46 grams of 1-aminoanthraquinone were diazotized and the diazonium compound obtained was coupled with 6.00 grams of 2-hydroxy-3-N-($\gamma$-diethylaminopropyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 10

4.46 grams of 1-aminoanthraquinone were diazotized and the diazonium compound obtained was coupled with 6.24 grams of 2-hydroxy-3-N-($\gamma$-piperidylpropyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 11

4.46 grams of 1-aminoanthraquinone were diazotized and the diazonium compound obtained was coupled with 7.12 grams of 2-hydroxy-3-N-($\gamma$-di-n-butylaminopropyl)naphthamide. Diazotization, coupling and recovery of the monoazo dyestuff formed were carried out in accordance with the procedure described in Example 1. The dyestuff obtained dyes polyacrylonitrile fibers, such as Verel and Orlon acrylic fibers, red shades which have good fastness to light, gas, washing and sublimation.

Example 12

188 grams of 2-hydroxy-3-naphthoic acid were slurried in 1000 cc. of dry benzene. A solution of 122 grams of SOCl₂ in 500 cc. of dry benzene was added over a period of 30 to 45 minutes. The reaction mixture resulting was stirred for 2.5 hours at room temperature, then raised slowly to 60° C. and held at this temperature until a clear solution resulted (about 2 hours). The excess SOCl₂, SO₂ and HCl was removed under vacuum while keeping the pot temperature at 60° C. or below. The last traces of SOCl₂, SO₂ and HCl were removed by passing a slow stream of dry air through the reaction mixture for about 15 minutes. The reaction mixture was cooled to 25° C. and 138 grams of anhydrous K₂CO₃ were added, after which a solution of 110 grams of 3-dimethylaminopropylamine in 300 cc. of dry benzene was added dropwise while keeping the pot temperature at 60° C. or below. The reaction mixture was stirred 6 hours longer at room temperature, then raised to 65° C. and filtered hot. The material collected on the filter was washed with three 2-liter portions of hot benzene. The combined filtrates were concentrated under vacuum to ⅓ their volume below 70° C. The reaction mixture was cooled to room temperature. The desired product which precipitated was recovered by filtration. A yield of 240 grams of 2-hydroxy-3-N-(γ-dimethylaminopropyl)naphthamide melting at 143° C., to 145° C. was obtained.

*Example 13*

Example 12 was repeated using 155 grams of γ-morpholinylpropylamine in place of 3-dimethylaminopropylamine. 2-hydroxy-3-N-(γ-morpholinylpropyl)naphthamide having a melting point of 131° C. to 135° C. was obtained.

*Example 14*

Example 12 was repeated using 152 grams of γ-piperidylpropylamine in place of 3-dimethylaminopropylamine. 2-hydroxy-3-N-(γ-piperidylpropyl)naphthamide having a melting point of 140 to 144° C. was obtained.

*Example 15*

29 cc. of 3-diethylamino-2-hydroxypropylamine in 50 cc. of dry benzene were added dropwise, with vigorous agitation, over a period of 1 hour to a solution of 20.65 grams of 2-hydroxy-3-naphthoyl chloride in 100 cc. of dry benzene at 70° C. When the addition was complete the temperature of the reaction mixture was raised to 80 to 85° C. and stirring was continued for one hour. The reaction mixture was then allowed to cool to 25° C. and the lumpy precipitate was ground under the mother liquor. The solid reaction product was allowed to settle and then the liquid layer was removed by decantation. The crude reaction product was dried 6 hours in a 60° C. oven then dispersed in 5 liters of water containing 150 cc. of concentrated hydrochloric acid. The temperature was raised to 80° C. and the mixture stirred at this temperature for 30 minutes. Any suspended solids were then removed by gravity filtration and the filtrate was made basic with an aqueous solution of sodium bicarbonate. The purified reaction product was recovered by filtration, washed well with water and dried at 60° C. 20 grams of 2-hydroxy-3-N-(γ-diethylamino-2-hydroxypropyl)naphthamide melting at 170° C. to 175° C. were thus obtained.

Following the general procedure described in the examples just given the other naphthamide coupling components are readily prepared. Many of the naphthamide coupling components employed in the preparation of the new azo compounds of our invention tend to be obtained as sticky solids.

The primary amines having the formula:

$$H_2N-R-N(R')_2$$

used in preparing the naphthamide compounds employed in the preparation of the azo compounds of our invention appear to include new as well as old compounds. Many of these amines are specifically disclosed in the prior art. Those not specifically disclosed can be prepared by the methods used to prepare the known compounds. 3-dimethylaminopropylamine is an article of commerce.

Three general processes by which primary amines having the formula:

$$H_2N-R-N(R')_2$$

can be prepared are set forth hereinafter.

(1) An amine having the formula:

$$H_2N(R')_2$$

is condensed with a chloroalkylnitrile having the formula: $Cl(CH_2)_xCN$, and the product obtained is reduced by sodium-alcohol or with hydrogen over Raney nickel to give the desired product:

$$H_2N(CH_2)_{x+1}N(R')_2$$

(2) Potassium phthalimide is condensed with a dibromoalkyl compound having the formula: $Br(CH_2)_zBr$ to obtain $C_6H_4(CO)_2N(CH_2)_zBr$ which is treated with an amine having the formula $H_2N(R')_2$ to give $$C_6H_4(CO)_2N(CH_2)_zN(R')_2$$

which is hydrolyzed with dilute mineral acid to give $H_2N(CH_2)_zN(R')_2$ the desired product. Method 2 is the well-known Gabriel synthesis.

(3) A secondary amine is added to an unsaturated nitrile, e.g. methacrylonitrile, and the product is hydrogenated to the desired primary amine.

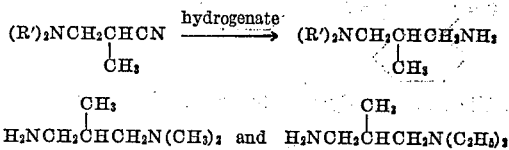

for example, can be readily prepared by method 3 by reacting dimethylamine and diethylamine, respectively, with methacrylonitrile and then hydrogenating the products obtained to their primary amine form.

R, R' and N(R')₂ as used herein have the meaning previously assigned to them, while $x$ is 1, 2 or 3 and $z$ is 2, 3 or 4.

The new monoazo dyestuffs of our invention can be applied to acrylonitrile polymers, such as polyacrylonitrile and acrylonitrile graft polymers, in the form of an aqueous dispersion.

The following example illustrates one satisfactory way in which the new monoazo dyestuffs can be used to dye an acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with hot water and dried.

The foregoing dyeing example is merely illustrative of the manner in which the new monoazo dyestuffs of our invention can be applied to acrylonitrile polymer textile materials. Larger or smaller amounts of the dyestuffs can be employed, for example. Similarly, dyeing assistants other than Igepal CA can be employed.

The invention has been described in detail with particular reference to preferred embodiments thereof, but it will be understood that variations and modifications can be effected within the spirit and scope of the invention as described hereinabove and as defined in the appended claims.

We claim:
1. The monoazo dyestuffs, devoid of a water-solubilizing group, having the formula:

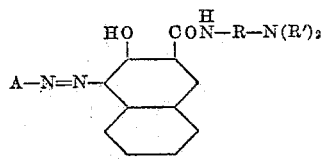

wherein A represents an anthraquinonyl nucleus which can be substituted with a member selected from the group consisting of a methyl group, a methoxy group, an ethoxy group, a bromine atom and a chlorine atom, R represents an alkylene radical selected from the group consisting of $-CH_2CH_2-$,  $-CH_2CH_2CH_2-$ and $-CH_2CHOHCH_2-$ R' represents an alkyl group having 1 to 4 carbon atoms and wherein $N(R')_2$ collectively represents a member selected from the group consisting of a morpholinyl radical and a piperidyl radical.

2. The monoazo dyestuff having the formula:

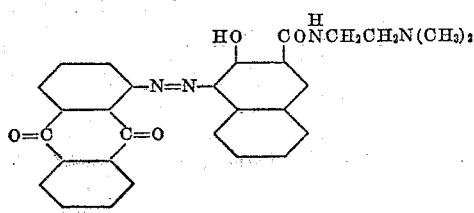

3. The monoazo dyestuff having the formula:

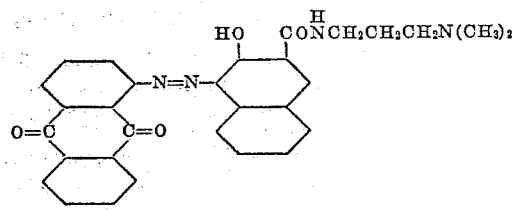

4. The monoazo dyestuff having the formula:

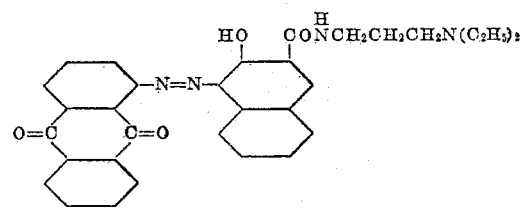

5. The monoazo dyestuffs having the formula:

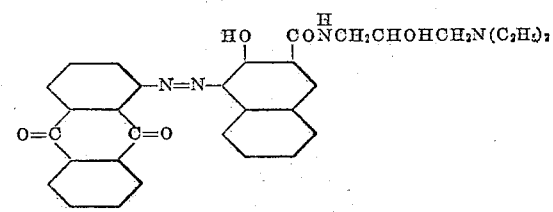

6. The monoazo dyestuff having the formula:

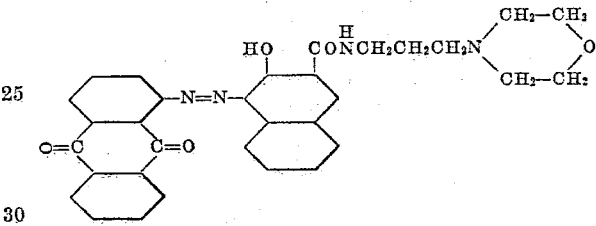

References Cited in the file of this patent
UNITED STATES PATENTS

| | | |
|---|---|---|
| 2,128,255 | Krzikalla et al. | Aug. 30, 1938 |
| 2,273,116 | Kranzelein et al. | Feb. 17, 1942 |
| 2,717,823 | Lowe | Sept. 13, 1955 |
| 2,884,410 | Randall | Apr. 28, 1959 |

FOREIGN PATENTS

| | | |
|---|---|---|
| 10,085 | Great Britain | July 9, 1914 |